Aug. 4, 1959   B. E. CURRAN ET AL   2,898,044
DAMPER CONTROL APPARATUS FOR DUAL DUCT AIR CONDITIONING SYSTEM
Filed May 6, 1957   3 Sheets-Sheet 1

INVENTOR.
Bernard E. Curran
Glenn E. Kautz
BY
Robert R. Churchill
ATTORNEY

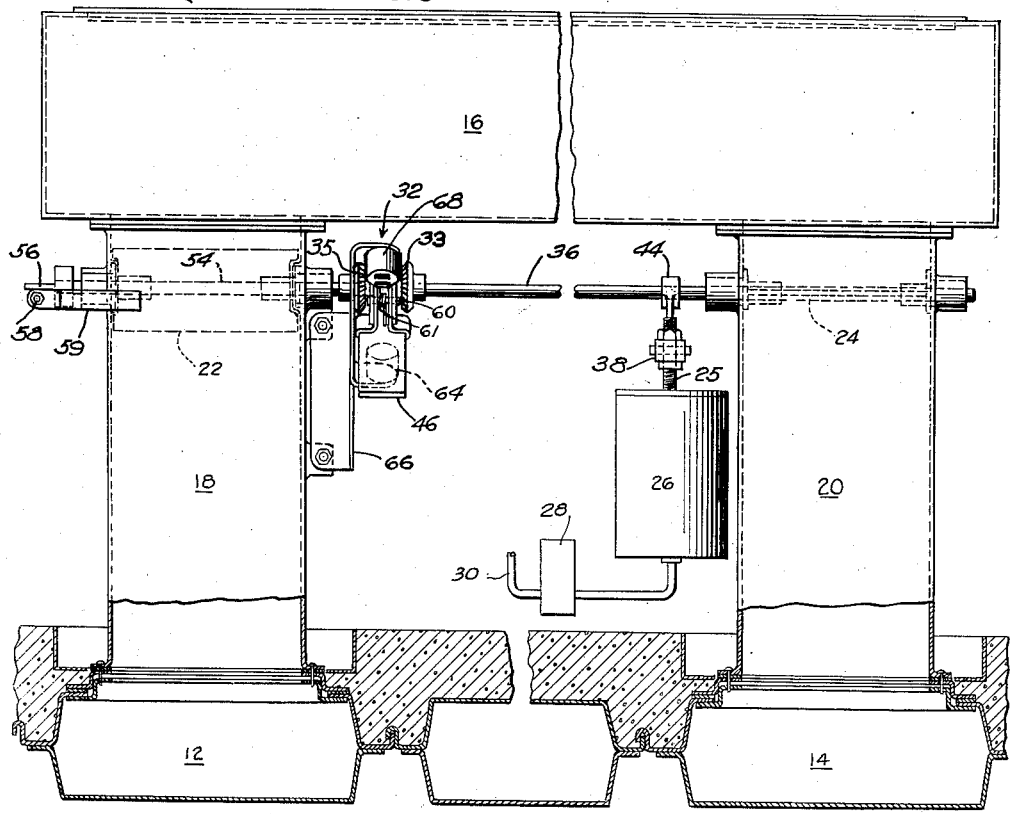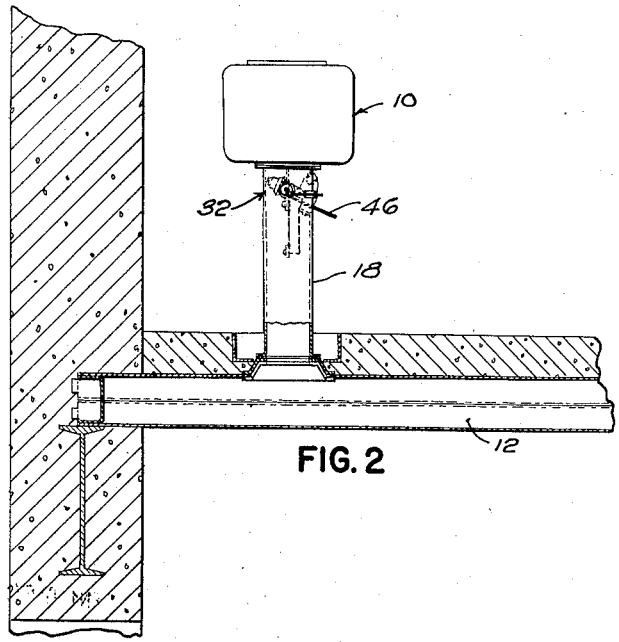

Aug. 4, 1959     B. E. CURRAN ET AL     2,898,044
DAMPER CONTROL APPARATUS FOR DUAL DUCT AIR CONDITIONING SYSTEM
Filed May 6, 1957     3 Sheets-Sheet 3
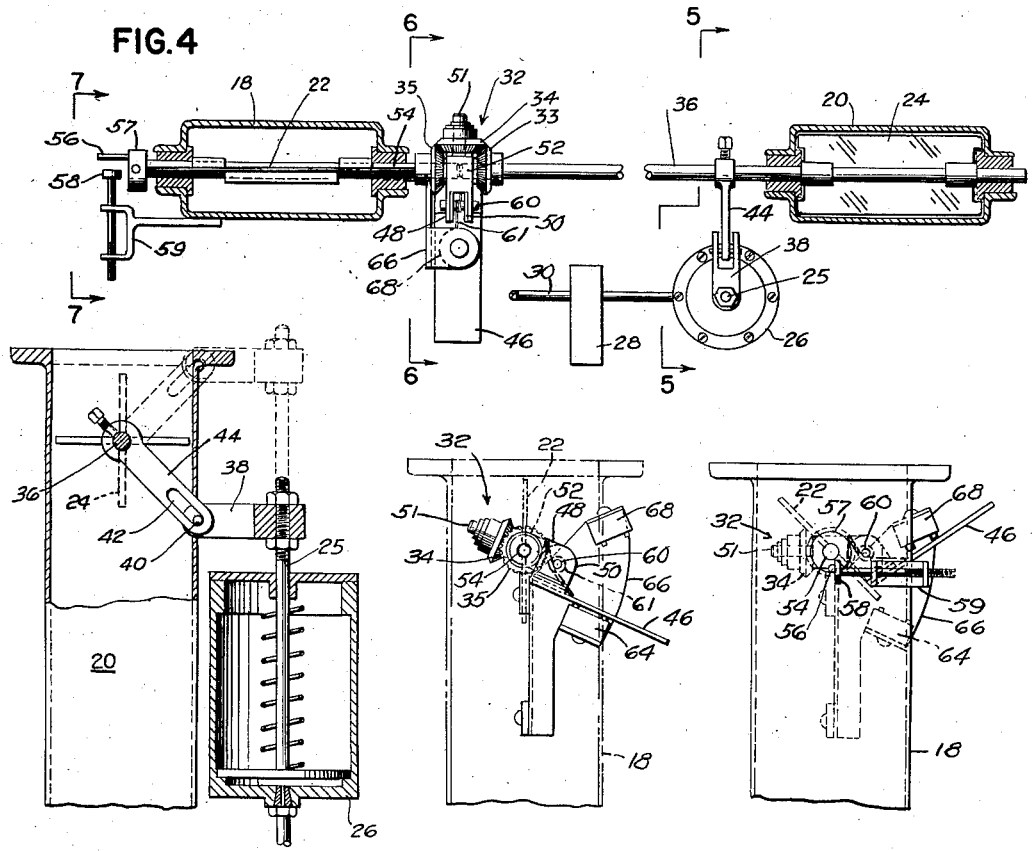
FIG.4
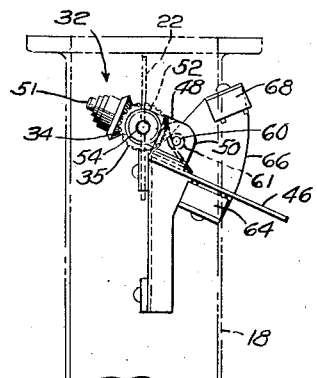
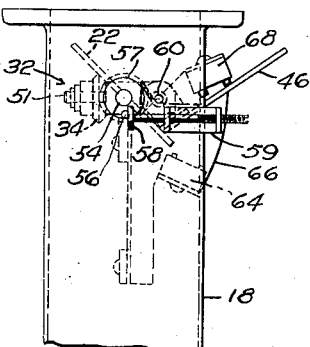
FIG.5     FIG.6     FIG.7
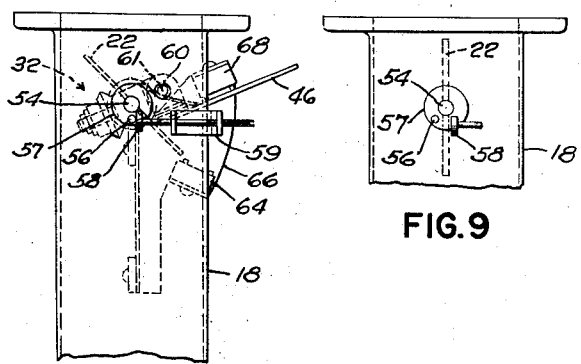
FIG.8     FIG.9
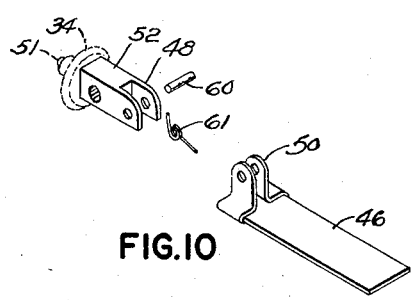
FIG.10
INVENTOR.
Bernard E. Curran
Glenn E. Kautz
BY
Robert L. Churchill
ATTORNEY

United States Patent Office 2,898,044
Patented Aug. 4, 1959

2,898,044

DAMPER CONTROL APPARATUS FOR DUAL DUCT AIR CONDITIONING SYSTEM

Bernard E. Curran and Glenn E. Kautz, Sewickley, Pa., assignors to H. H. Robertson Company, a corporation of Pennsylvania Application May 6, 1957, Serial No. 657,202

5 Claims. (Cl. 236—1)

This invention relates to novel damper control apparatus for a dual duct air conditioning system.

The invention has for an object to provide novel and efficient apparatus for controlling the two modulating volume control dampers used in controlling the air flow from each pair of dual ducts into a single outlet box from which the air is discharged into the building to the end that the pair of ducts may be used for supplying hot and cold air for winter operation and also to permit both ducts to be used for supplying cool air during the summer or cooling season.

A further object of the invention is to provide novel apparatus of the character described which may be used with advantage in the air conditioning system forming the subject matter of the Goemann Patent No. 2,729,429, dated January 3, 1956.

With these general objects in view and such others as may hereinafter appear the invention consists in the damper control apparatus hereinafter described and particularly defined in the claims at the end of this specification.

In the drawings illustrating the preferred embodiment of the invention:

Fig. 2 is a cross sectional view of a portion of the air conditioning system shown in Fig. 1 and illustrating an outlet box embodying the present control apparatus;

Fig. 3 is a front elevation of the outlet box embodying the present control apparatus;

Fig. 4 is a cross sectional plan view of the damper control apparatus shown in Fig. 3;

Fig. 5 is a side elevation partly in cross section as seen from the line 5—5 of Fig. 4;

Fig. 6 is a similar view as seen from the line 6—6 of Fig. 4;

Fig. 7 is a view similar to Fig. 6 showing the control apparatus in a different position of operation and as seen from the line 7—7 of Fig. 4;

Fig. 8 is a view similar to Fig. 7 showing the apparatus in still another position of operation;

Fig. 9 is a detail view in side elevation of damper stop mechanism to be referred to; and Fig. 10 is a perspective view of an operating arm forming a part of the present control apparatus.

Figure 1:
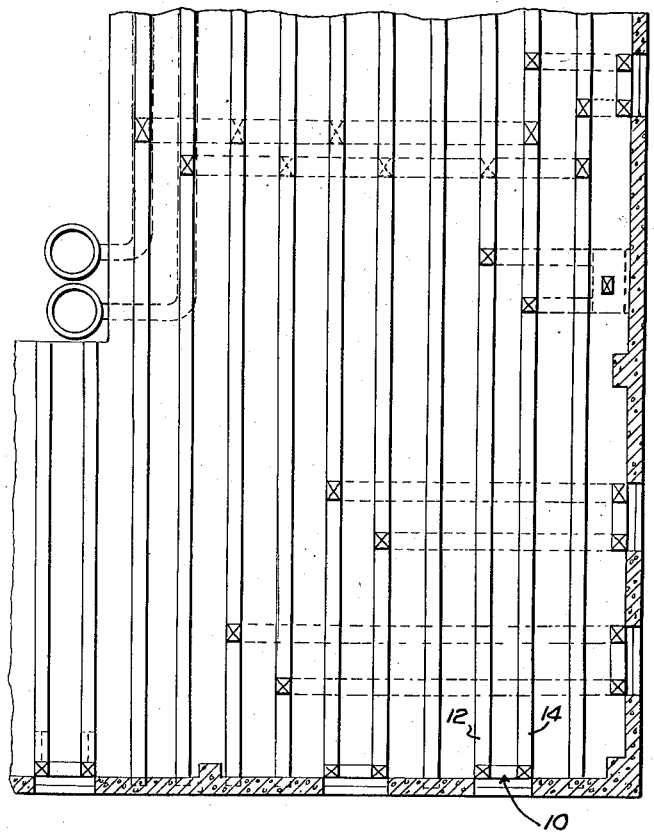
Fig. 1 is a diagrammatic plan view of a portion of a building embodying an air conditioning system provided with sill or outlet boxes in which the present damper control apparatus may be used.

The present invention contemplates novel damper control mechanism for controlling the movements of and relationship of each pair of dampers employed in controlling the supply of hot and cold air to a discharge outlet in a dual duct air conditioning system and particularly in an air conditioning system of the type forming the subject matter of the Goemann patent above referred to. The novel control mechanism enables the convenient conversion of each pair of the ducts serving the outlets from winter operation wherein hot and cold air flow through the different ducts of each pair to summer operation wherein both ducts carry cool air.

The invention will be described in connection with the preferred system as embodied in the structure shown generally in the Goemann patent above referred to.

Referring now to the drawings, the present damper control mechanism is an improvement upon the damper control mechanism illustrated in Figs. 17, 18 and 21 of the Goemann patent above referred to, wherein the air distributing outlets 10 are in communication with hot and cold air conducting cells 12, 14 forming a part of the flooring structure as indicated in Fig. 1. The sill box 10 is provided with a mixing chamber 16 having a pair of stacks 18, 20 connected to the hot and cold air ducts 12, 14 respectively, and each stack is provided with a damper 22, 24 respectively arranged at right angles to each other for the winter heating season. The dampers are arranged to be rotated by connections to an air cylinder 26 actuated by a thermostat 28 which is connected in a compressed air supply line 30, the thermostat acting as a valve to increase or decrease the air pressure from the line 30 upon an increase or decrease in the room temperature. As thus arranged, an increase in room temperature will effect opening of the cold air damper 24 and closing of the hot air damper 22, and a decrease in room temperature will effect closing of the cold air damper and opening of the hot air damper whereby to modulate the hot and cold air dampers against each other during the winter heating cycle.

For summer cooling operation wherein both air conducting cells 12, 14 carry cold air it is preferred to change the position of the dampers from a position at right angles to each other to a position parallel to each other so as to effect a simultaneous increase or decrease of cold air from both stacks in response to variations in room temperature.

The present invention is directed particularly to apparatus for manually changing the position of one of the dampers through 90° when the seasonal changeover is made so as to arrange both dampers in parallel relation at this time. As shown in Figs. 3 and 4, the dampers 22, 24 are initially arranged at right angles to each other for the winter heating season and are connected through a differential gear device indicated generally at 32. In operation when the operating cylinder piston 25 is moved up in response to an increase in room temperature the right hand damper 24 is rocked from a closed to an open position in a counterclockwise direction, and through the 1 to 1 ratio of the differential gears 33, 34, 35 of the unit 32 the left hand damper 22 is rocked an equal amount from an open to a closed position in a clockwise direction.

As shown in Fig. 5, the connections between the operating cylinder piston 25 and the right hand damper shaft 36 include an arm 38 having a pin 40 which is arranged to cooperate with a slot 42 in an arm 44 fast on the shaft 36, the cylinder 26 being arranged to rock the shaft through 90° from an open to closed position and from a closed to an open position in response to variations in air pressure as controlled by the thermostat valve 28 in response to variations in room temperature.

As herein shown, the differential gear 33 is connected to the end of shaft 36 and the opposed differential gear 35 is connected to the end of an aligned and abutting shaft 54 which carries the damper 22, the planetary gear 34 being mounted to rotate on a stud 51 extended from a bearing block 52 mounted to rock on the aligned and abutting ends of the shafts 36, 54.

During the summer cooling season both air conducting cells 12, 14 are connected to a cool air supply. In accordance with the present invention in order to change the position of the dampers from their winter position of operation to a position for summer operation, wherein the dampers are substantially parallel, the left hand damper 22 is preferably rotated through 90° into parallel relation with the right hand damper 24. In order to effect such rotation the bearing block 52 is provided with an extension 48 which is pivotally connected to the upstanding ears 50 of an operating arm 46 by a resilient connection comprising a spring loaded toggle joint to permit overtravel of the linkage. As shown in detail in Fig. 10, the resilient connection includes a spring 61 coiled about the pivot pin 60, one extended end of the spring bearing against a portion of the block 52 and the other extended end of the spring bearing against the arm 46 and tending to urge the block 52 and the arm 46 into a radially aligned position, as shown in Fig. 6, the arm 46 being arranged to be rocked upwardly, as shown in Fig. 8, to change the relative positions of the dampers, the resilient connection being provided to permit movement of the arm 46 upwardly when the block 52 is held in an intermediate stationary position as will be described.

In operation during the winter heating season when the supply cells 12, 14 carry hot and cold air respectively the manually operated arm 46 is maintained in its downwardly rocked position, as shown in Fig. 6, by a permanent magnet 64 mounted on a bracket 66 secured to the stack 18, the arm and magnet holding the block 52 stationary so that the dampers 22, 24 maintain a position at right angles to each other to modulate the hot and cold air as described. However, during the summer cooling season the operating arm 46 may be manually pulled away from the magnet 64 and rocked upwardly, as shown in Fig. 8, thereby rocking the bearing block 52 in a counterclockwise direction, the operating arm being held in its upwardly rocked position by a second or upper permanent magnet 68 also mounted on the bracket 66. Since the operating cylinder 26 holds the right hand shaft 36 and differential gear 33 stationary at this time, the planetary gear 34 will roll on gear 33 and effect a 2 to 1 ratio rotation of gear 35. Thus, rotation of the bearing block 52 through 45° will effect rotation of the left hand damper shaft 54 and its damper 22 through 90° to dispose the left hand damper 22 parallel to the right hand damper 24 for the summer cooling season. It will be observed that the bearing block 52 is rocked in a counterclockwise direction, viewing Fig. 7, and that the damper 22 is also rocked in a counterclockwise direction, but twice as far as the bearing block 52.

From the above description it will be observed that there is a parallel relationship between the two dampers and a movement of the damper 22 through a full 90° to effect the seasonal changeover. This may be preferred for some installations. However, during the summer cooling season it may not be desired to completely cut off the air supply from both stacks 18, 20. Instead, it may be preferred to hold the damper 22 in a partially open position in order to meet minimum ventilation requirements. For this purpose a crank pin 56 carried by a collar 57 fast on the end of the left hand damper shaft 54 is arranged to cooperate with an adjustable set screw 58 carried by a stationary bracket 59 so as to prevent rotation of the damper 22 through a full 90°. As shown in Fig. 7, the rotation of the damper 22 may be limited to a rotation of about 45° by the stop mechanism, and since such mechanism will also stop the rotation of the bearing block, the block will have moved through one-half this distance, or 22½°. The operating arm 46, however, is further rocked into engagement with the upper magnet 68, the arm 46 pivoting on the pin 60 to permit such movement. During subsequent operation of the operating cylinder 26, in response to variations in room temperature rotation of the right hand damper shaft 36 in a counterclockwise direction to open the damper 24 together with the tendency of the spring 61 to urge the gear 35 and block 52 in a counterclockwise direction causes the bearing block 52 to be rocked in a counterclockwise direction through gears 33, 34, the gear 34 rolling on gear 35 since the damper shaft 54 and its differential gear 35 frictionally remain in a stationary position. This action continues until the right hand damper is moved in an opening direction to a 45° position which corresponds to the position of the left hand damper, whereupon the block 52 and arm 46 are permitted to come into radial alignment with each other, as shown in Fig. 8, by the resilient connection therebetween. Thereafter further rotation of the right hand shaft 36 in a counterclockwise opening direction will effect rotation of the left hand shaft 54 and its damper 22 in a clockwise opening direction and will also move the pin 56 away from the set screw 58, the bearing block 52 remaining in its 45° position until subsequent operation of the operating cylinder 26 in the opposite direction again brings the stop elements 56, 58 into operative engagement.

From the above description it will be seen that during the winter heating season the dampers 22, 24 are set at right angles to each other so that in operation the hot and cold air dampers are modulated against each other to supply different or equal amounts of hot and cold air to be mixed and discharged from the sill box in response to variations in room temperature, the cold and hot air dampers being rotated in opposite directions through the differential drive mechanism 32. During the summer cooling season, when both stacks 18, 20 are supplied with cool air, the manually operated arm 46 is rocked upwardly to effect rotation of the block 52 through 45° to rotate the damper 22 through 90° in a counterclockwise direction and to dispose the left hand damper 22 substantially parallel to the right hand damper 24, the upper magnet 68 maintaining the bearing block 52 in its 45° position throughout the summer cooling season so that upon opening or closing of the right hand damper 24 the left hand damper 22 will be simultaneously opened and closed but in opposite directions through the differential unit 32. It will also be observed that, if desired, the stop mechanism may be used to prevent a full 90° rotation of the damper 22 so as to maintain the damper 22 at least partially open to meet the minimum requirements for ventilation purposes, the resilient mounting 60, 61 permitting overtravel of the bearing block 52 relative to the arm 46, as shown, to accommodate the stop mechanism.

In practice it will be seen that the present damper control apparatus enables the air conditioning system to be rapidly and efficiently converted from its winter heating cycle of operation to its summer cooling cycle of operation, or vice versa. The changeover from winter to summer operation may be effected in any position of operation or point in the cycle of the dampers 22, 24 existing at the time of the changeover. It will also be apparent that the thermostatically controlled damper motor 26 will continue to respond to the room temperature in the same manner as before the changeover such that the relative openings afforded by the dampers 22, 24 are substantially identical thereafter without causing any overlapping position of the dampers during the changeover or discomfort to the occupants of the room during or after the changeover.

It will be understood that the positions of the dampers 22, 24, recited herein as being at right angles to each other during one set of conditions and as being parallel to each other during a second set of conditions, refer to their relative initial positions, that is, when one damper is entirely opened and the other damper entirely closed under said one set of conditions, and when both are entirely closed under said second set of conditions, one damper being moved through 90° relative to the other by the changeover mechanism to afford modulation of the hot and cold air under said one set of conditions, and to afford balanced or equal flow of cold air past the dampers during said second set of conditions, the dampers moving in opposed directions through the differential unit in each instance.

While the preferred embodiment of the invention has been herein illustrated and described, it will be understood that the invention may be embodied in other forms within the scope of the following claims.

Having thus described the invention, what is claimed is:

1. In a dual duct air conditioning system, an air distributing outlet box having dual inlet ducts adapted for connection to dual air supply ducts, a damper in each inlet duct, said dampers being disposed at right angles to each other under one set of conditions, thermostatically controlled means for operating said dampers to effect closing of one damper while the other damper is opening under said one set of conditions, manually operated changeover means for rotating said one damper through 90° with relation to the other damper under a second set of conditions, said thermostatically controlled means thereafter controlling the operation of the dampers to effect movement of the dampers relative to one another while maintaining the openings substantially identical with each other at all times during the second set of conditions, said manually operated changeover means including a differential connection between said dampers and an operating arm connected thereto for rotating the differential to effect rotation of said one damper relative to the other, said operating arm being movable between two different positions, and means for detachably retaining the arm in its different positions.

2. A dual duct air conditioning system as defined in claim 1 wherein the means for detachably retaining the arm in its different positions includes a pair of permanent magnets cooperating with said arm.

3. A dual duct air conditioning system as defined in claim 1 which includes stop means cooperating with said one damper to prevent complete closing thereof whereby to maintain a predetermined minimum distribution of air under said second set of conditions, and a resilient connection between said differential and said operating arm to permit overthrow of said arm when said one damper is engaged by said stop means.

4. In a dual duct air conditioning system, an outlet box having dual inlet ducts adapted for connection to dual air supply ducts, a damper in each inlet duct, said dampers being disposed at right angles to each other under one set of conditions, control means for operating said dampers to effect closing of one damper while the second damper is opening under said one set of conditions, said control means being connected to said second damper, and coupling means connecting the dampers, manually operated changeover means operatively connected to said coupling means and arranged to be moved for effecting the rotation of said one damper to a position substantially parallel to the second damper under a second set of conditions, said second damper being held stationary by the control means during the changeover operation, said control means thereafter controlling the movement of the dampers relative to one another while maintaining the damper openings substantially identical with each other for at least a portion of the second set of conditions, and means for detachably retaining the manually operated means in its moved position.

5. In a dual duct air conditioning system, an outlet box having dual inlet ducts adapted for connection to dual air supply ducts, a damper in each inlet duct, coupling means between said dampers arranged to permit simultaneous operation of the dampers in opposite directions, said dampers being disposed at right angles to each other for operation under one set of conditions, control means for operating said dampers, manually operated changeover means operatively connected to said coupling means and arranged to be moved to effect rotation of one damper to a position substantially parallel to the second damper for operation under a second set of conditions, and means for detachably retaining the changeover means in its moved position.

References Cited in the file of this patent
UNITED STATES PATENTS

| | | |
|---|---|---|
| 1,015,204 | Murray | Jan. 16, 1912 |
| 2,196,494 | Gibbs | Apr. 9, 1940 |
| 2,727,691 | Alyea | Dec. 20, 1955 |